United States Patent [19]
Murphy

[11] Patent Number: 5,701,844
[45] Date of Patent: Dec. 30, 1997

[54] CONTAINER WITH WASTE REMOVAL DEVICE

[76] Inventor: Edward J. Murphy, 6510 Preston Trail Dr., Houston, Tex. 77069

[21] Appl. No.: 546,888

[22] Filed: Oct. 23, 1995

Related U.S. Application Data

[63] Continuation-in-part of Ser. No. 288,933, Aug. 10, 1994, Pat. No. 5,463,982.

[51] Int. Cl.$^6$ ............................................. A01K 29/00
[52] U.S. Cl. .................................................. 119/166
[58] Field of Search .............................. 119/165, 166; 209/417, 418, 419; 294/1.3

[56] References Cited

U.S. PATENT DOCUMENTS

| | | | |
|---|---|---|---|
| 97,025 | 11/1869 | Bencus | 209/418 |
| 902,954 | 11/1908 | Felty | 209/419 |
| 4,217,857 | 8/1980 | Geddie | 119/1 |
| 4,224,751 | 9/1980 | Schoemann et al. | 294/55 X |
| 4,312,295 | 1/1982 | Harrington | 719/1 |
| 4,325,822 | 4/1982 | Miller | 209/251 |
| 4,505,226 | 3/1985 | Carlson | 119/1 |
| 4,553,671 | 11/1985 | Cheesman | 106/611 |
| 4,615,300 | 10/1986 | McDonough | 119/1 |
| 4,771,731 | 9/1988 | Derz et al. | 119/1 |
| 4,802,442 | 2/1989 | Wilson | 119/166 |
| 4,832,228 | 5/1989 | Hickey | 220/408 |
| 5,012,765 | 5/1991 | Naso et al. | 119/166 |
| 5,101,771 | 4/1992 | Goss | 119/173 |
| 5,158,042 | 10/1992 | Hammerslag et al. | 119/167 |
| 5,220,886 | 6/1993 | Hyde | 119/165 |
| 5,303,675 | 4/1994 | Van Den Bergh | 119/165 |
| 5,320,064 | 6/1994 | Selstad | 119/17 |
| 5,341,763 | 8/1994 | Bondurant, III | 119/166 |
| 5,347,950 | 9/1994 | Kasbo et al. | 119/171 |
| 5,454,349 | 10/1995 | Bondurant | 119/166 |
| 5,463,982 | 11/1995 | Murphy | 119/166 |

OTHER PUBLICATIONS

U.S. Official Gazette entry for U.S. Design Patent D 351, 489, issued to Helfrick on Oct. 11, 1994 from U.S. application Ser. No. 2,982 filed on 24 Dec. 91.
"Amazing Tabby Tender," Dualle Products, 2 pages.
"The Container Store Closet Planning Guide," The Container Store, 1989.

*Primary Examiner*—Thomas Price
*Attorney, Agent, or Firm*—Guy McClung

[57] ABSTRACT

A waste containment system has been developed which in one aspect includes a container and a waste removal apparatus removably disposed in the container. In one aspect the waste removal apparatus is releasably held by a hook on a handle or handles, the hook engaging a lip of the container. The waste removal apparatus, in one aspect has a reticulated grid or mesh structure for the passage therethrough of litter material and for the retention thereon of either animal waste deposited on or in the litter or waste/litter agglomerates formed upon contact of agglomerating litter with animal waste. Such an apparatus may have a plate or blade end to facilitate its insertion into a mass of litter and one or more side walls or handles for ease of manipulation. A tapered pointed lip is on the blade end of certain embodiments. One or more weights may be placed on, releasably connected to, or formed of the apparatus or the reticulated structure to inhibit up-thrust of a mass of litter material.

19 Claims, 7 Drawing Sheets

CONTAINER WITH WASTE REMOVAL DEVICE

RELATED APPLICATION

This is a continuation-in-part of U.S. application Ser. No. 08/288,933 filed on Aug. 10, 1994 now Pat. No. 5,463,982, entitled "Waste Removal Device."

BACKGROUND OF THE INVENTION

1. Field of the Invention

This invention is directed to apparatus for removing animal waste from a container and for removing clumped waste-litter agglomerates from a litter mass, to a container with such an apparatus, and, in one aspect, to such apparatus with an open end to facilitate emplacement in a litter mass.

2. Description of Related Art

The prior art reveals a variety of animal litter substances which agglomerate or "clump up" when contacted by animal waste, e.g. U.S. Pat. No. 5,101,771 discloses such substances. The prior art also discloses a variety of containers for such animal litter substances and litter boxes; e.g. U.S. Pat. Nos. 4,325,822; 5,012,765; 4,615,300; 4,217,857; 4,312,295; 5,158,042; 5,320,064; 4,771,731; 5,220,886; 4,505,226; 4,832,228; 4,553,621.

A problem is encountered in the removal of the clumped-up litter/waste agglomerate from the remainder of un-agglomerated material. One method of dealing with the problem is simply the wasteful disposal of all of the material. Another solution involves scooping out the clumped-up litter/waste agglomerate, e.g. with a shovel or other implement, but this can also result in the considerable waste of un-agglomerated material. Another problem is the difficulty encountered in emplacing a box or screen into a mass of litter.

There has long been a need for an effective and efficient apparatus for removing animal waste from a container and for removing clumped-up litter/waste agglomerate from a mass of clumping litter material and for a container with such apparatus. There has long been a need for such apparatus which is easily emplaceable in such a mass of litter material.

SUMMARY OF THE PRESENT INVENTION

The present invention, in one embodiment, discloses an apparatus for removing clumped-up litter/waste agglomerate from a mass of litter material, the apparatus in one aspect including a reticulated structure with a plurality of openings therethrough for disposition within the mass of litter beneath a surface of the mass and a handling device or devices connected to the reticulated structure to facilitate removal of the reticulated structure from the mass of litter. When animal waste is deposited on the litter mass and clumps of litter and waste are agglomerated in the mass, lifting the reticulated structure allows the un-agglomerated litter to fall through the openings while the litter/waste agglomerates remain on top of the reticulated structure. This reticulated structure may be releasably securable to or formed integrally of a holding framework or box structure, preferably with one open side or end. Typically in one embodiment the reticulated structure is a mesh of criss-crossed fibers, rods, filaments or wires forming a plurality of openings with a largest dimension of about a half inch.

In another embodiment such an apparatus includes a box with three side walls and one open side, an open top, and a bottom comprising the previously described reticulated structure across its bottom. At the bottom of the open side of the box is a plate, flat member, or lip which facilitates emplacement of the box sideways into a mass of litter (rather than a more difficult emplacement from above which requires pressing the reticulated structure downwardly with the mass which, although within the scope of this invention, is not preferred).

In one embodiment substantially all of the bottom of the apparatus or box is made of a reticulated open grid, network or mesh material which is either secured to or formed integrally of the bottom of the apparatus. In another embodiment one or more weight members is removably emplaced on or formed integrally of the bottom of the apparatus or box to inhibit a tendency of a mass of litter material in a container to push the mass's center upwardly. In one embodiment two weights are used, one at each end of a reticulated structure in a rectangular apparatus.

In one embodiment this invention discloses an animal waste removal apparatus which is useful with any fine grained litter material whether it is of the waste-agglomerating type or not. A screen or reticulated structure is used of sufficiently small mesh size to permit the fine-grained litter (e.g. but not limited to sand) to flow downwardly through the apparatus, while retaining animal waste on top of the screen or reticulated structure. In certain aspects the previously described handles, etc. and flat plate or lip etc. are incorporated into such a waste removal apparatus.

In certain embodiments the reticulated structure is a separate member releasably secured to or removably emplaced in a framework, box support or handle structure. In other embodiments, either the entire apparatus or the reticulated structure is made from disposable and/or environmentally safe material and/or substances, including but not limited to certain plastics, cardboard, fiberboard and paper.

The present invention discloses, in one aspect, a container with a waste removal apparatus like any of the previously-described apparatuses or any apparatus described below. In certain embodiments the apparatus simply rests in the container. In other embodiments the apparatus is releasably connected to the container; e.g. with releasably cooperating connectors on the apparatus and on the container, with a handle lock portion on at least one handle (two handles in certain embodiments on opposed sides) that releasably engages an edge or lip of the container, with a bead, extension, or nose on a portion on the apparatus which pops into and is releasably held in a corresponding recess or hole in the container (or vice versa), with a turned-down inverted U-shaped or V-shaped portion that pops onto and off of a corresponding upper edge of the container with a friction fit or snap fit, or with one or more extending members on the underside of the handles and a slit or hole in the container for releasably receiving and holding the one or more members.

It is, therefore, an object of at least certain preferred embodiments of the present invention to provide:

New, useful, unique, efficient, non-obvious devices and methods for removing waste and waste/litter agglomerates from a mass of litter;

Such devices with structure for facilitating sideways emplacement into a litter mass;

Such devices with one or more handles or open slots for easy manual grasping or holding;

Such devices in which a screen or reticulated bottom member is releasably secured to or removably securable in a framework, box, or other structure or with one or more handles removably secured thereto or formed therein; and Such devices with one or more weights to inhibit or prevent central upward thrust of a litter mass in which the device is emplaced;

A container with any such device; and

A container with any such device, the device releasably secured to or releasably connected to the container.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention should be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this parent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 11A is a perspective view of a container with a waste removal device according to the present invention. FIG. 11B is a partial cross-sectional view of the waste removal device of FIG. 11A releasably secured to the container of FIG. 11A.

DESCRIPTION OF EMBODIMENTS PREFERRED AT THE TIME OF FILING FOR THIS PATENT

FIGS. 1–6 show a device 100 according to the present invention which has a body member 102 with two opposed side members 104 and 106 spaced apart by an end member 108 and a bottom member 110. Each side 104, 106 has a handle 112, 114 respectively secured thereto or formed integrally thereof.

Figure 1:
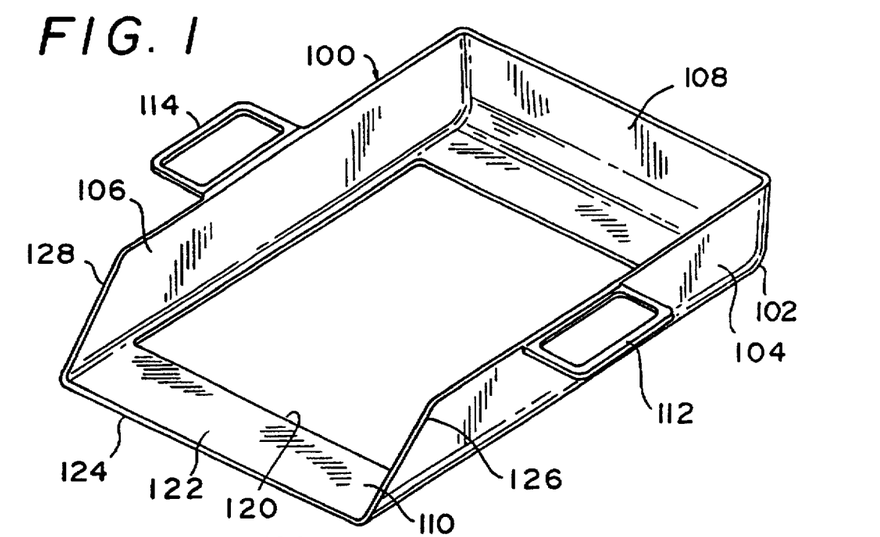
FIG. 1 is a perspective view of a waste removal device according to the present invention.
Figure 2:
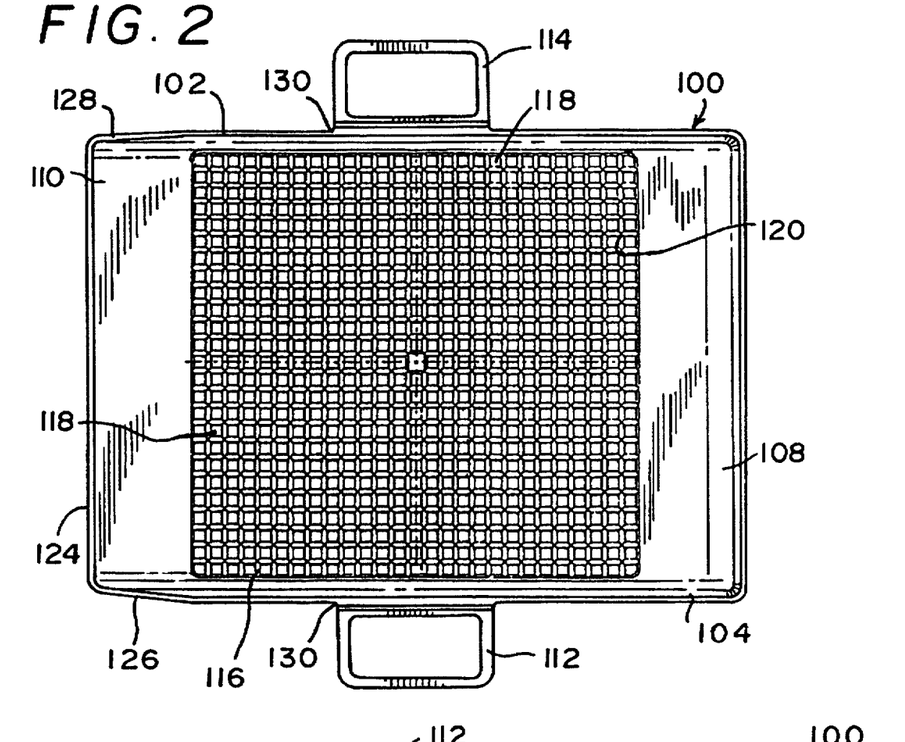
FIG. 2 is a top view of the device of FIG. 1.
Figure 3:
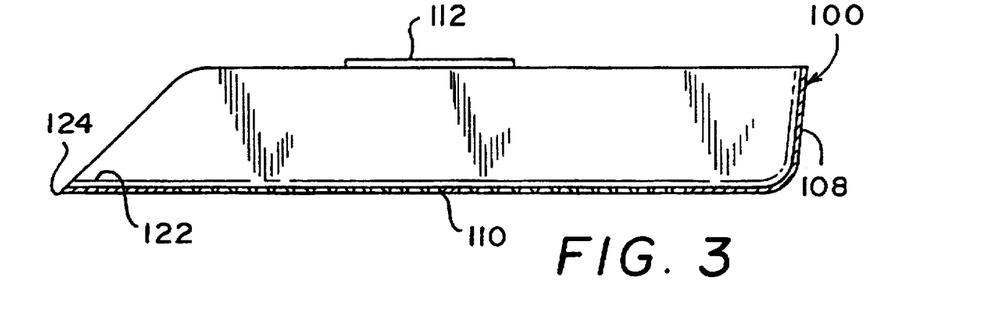
FIG. 3 is a side cross-sectional view of the device of FIG. 1.
Figure 4:
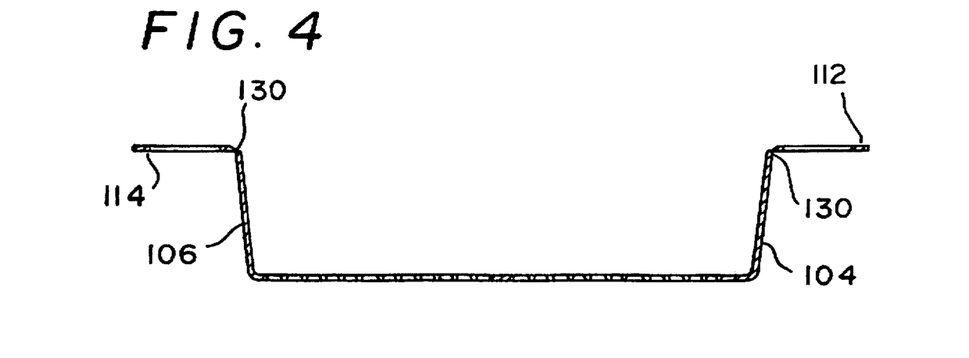
FIG. 4 is a bottom view of the device of FIG. 1.
Figure 5:
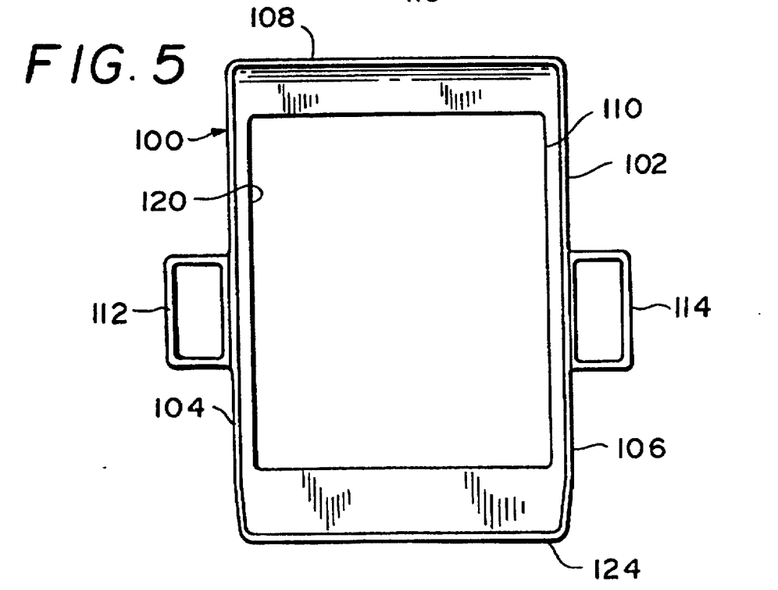
FIG. 5 is a bottom view of the device of FIG. 1.
Figure 6:
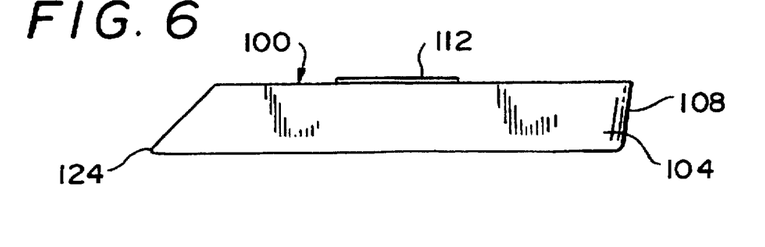
FIG. 6 is a side view of one side of the device of FIG. 1. The other side is a mirror image of this side.

A reticulated structure 116 (FIG. 2) with multiple openings 118 is removably securable (e.g. by friction fit) in a recess 120 of the bottom member 110. An end 122 of the bottom member 110 has a tapered, pointed lip 124 which facilitates emplacement of the device 100 into a litter mass. Tapered ends 126, 128 of the sides 104, 106, respectively, also facilitate such emplacement.

Each handle may have a flexible hinge-like member 130 so that the handles are movable with respect to their respective side members 104, 106.

Figure 7:
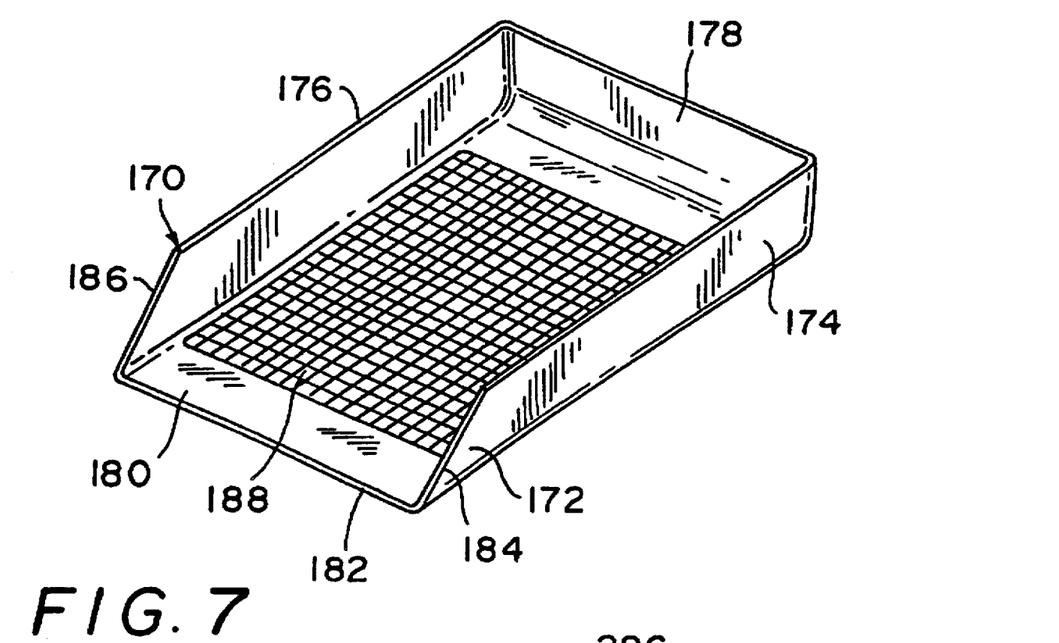
FIG. 7 is a perspective view of a waste removal device according to the present invention.

FIG. 7 illustrates another embodiment 170 of a device according to the present invention which is similar to the previously-described device 100, but which has a web-like structure 188 formed integrally of a body member 172 and which has no handles. But for these two differences the various views of the device 170 are like the various views of the device 100 shown in FIGS. 2–6. In one embodiment the device 170 is a single unitary plastic structure with an end member 178; two opposed sides 174, 176; and a bottom member 180 with a tapered, pointed end 182. Each side 174, 176 has a tapered end 184, 186 respectively.

Figure 9A:
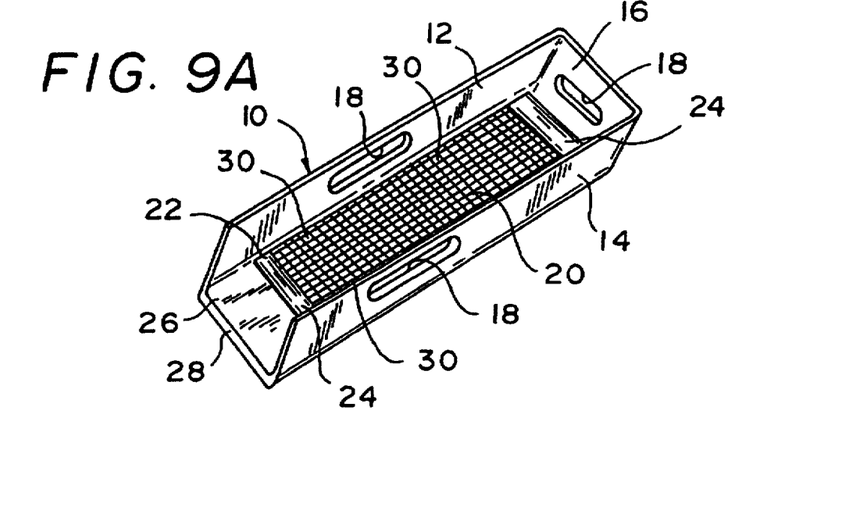
FIG. 9A is a perspective view of a waste removal device according to the present invention.
Figure 9B:
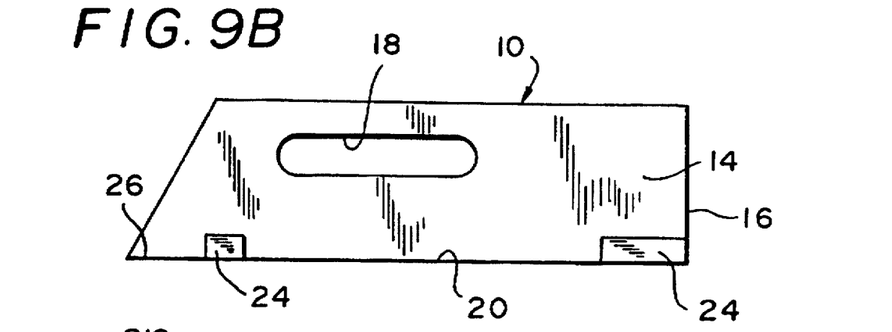
FIG. 9B is a side view thereof.

Referring now to FIG. 9, a waste removal apparatus 10 has two opposed side walls 12 and 14 with an end wall 16 interconnected therebetween. A slot 18 is cut out of each wall to facilitate grasping of the apparatus, emplacement of it in a mass of litter, and upward removal of it therefrom. A bottom 22 of the apparatus 10 comprises a reticulated structure 20, weight members 24 and an end plate member 26.

As shown, the weight members 24 are solid weights secured to the reticulated structure 20. Of course it is within the scope of this invention for the weight (one or a plurality of weights) to rest on the reticulated structure 20 or some other part of the apparatus or for it to be formed integrally of the apparatus or of the reticulated structure.

The plate member 26 has a tapered outer edge 28 which facilitates the entry of the plate member 26 and hence the entire apparatus into a mass of litter, e.g. sideways rather than directly from above. A plate member 26 of sufficient size and/or density may also serve as a weight member or as an additional weight member.

Preferably the reticulated structure 20 has a plurality of openings 30 which are sized to allow pieces, particles, or grains of litter material to pass through and to hold waste thereon without its passage therethrough. In one aspect the openings are sized to prevent the passage therethrough of waste/litter agglomerations when the litter is of the type that agglomerates when contacted by animal waste. In one embodiment the openings have a largest dimension of about a half inch.

The reticulated structure 20 as shown in FIG. 9A is formed integrally of the apparatus 10 and the apparatus 10 is a single unitary piece. It is within the scope of this invention for the reticulated structure 20 to be releasably secured to the side walls and end wall (or to other support structure or handle structure). It is also within the scope of this invention for the reticulated structure to be emplaced within a framework or a walled structure.

The outer edge 28 of the plate member 26 may be tapered, rounded, pointed, or any desirable configuration for facilitating its insertion into a mass of litter.

Figure 10:
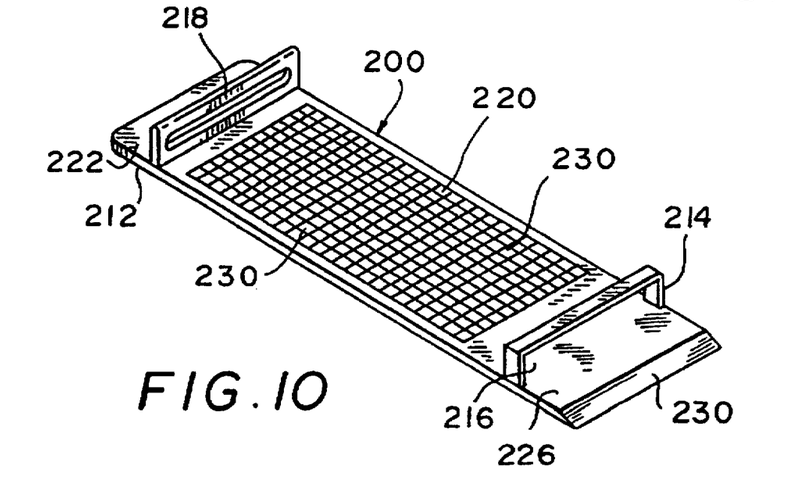
FIG. 10 is a perspective view of a waste removal device according to the present invention.

FIG. 10 discloses a waste removal device 200 according to the present invention with a reticulated grid 220 with a plurality of openings 230 therethrough. At one end of the grid 220 a plate member 226 with a tapered end 230 is positioned to facilitate entry of the device into a mass of litter. At the other end of the device is a first upright handle 212 with a hole 218 therethrough. An end member 222 extends from the end of the device 200. Another upright handle 214 at the other end of the device has an opening 216 thereunder for the passage therethrough of litter material.

Figure 8:
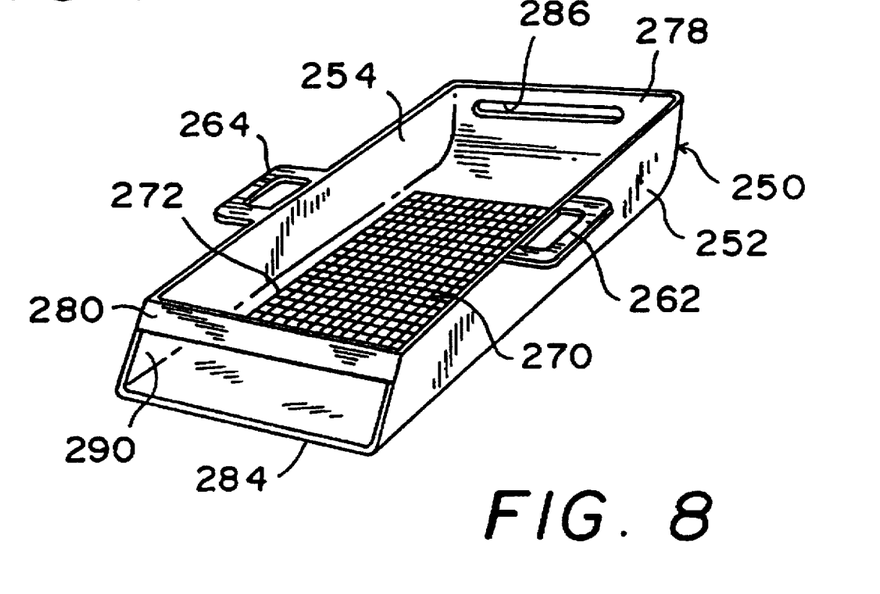
FIG. 8 is a perspective view of a waste removal device according to the present invention.

FIG. 8 discloses a waste removal apparatus 250 according to the present invention with two side walls 252, 254, with handles 262 and 264, respectively; bottom member 272 with a bottom reticulated structure 270, and end member 278, and an end support bar 280. The side walls 252, 254; bottom member 272 and end support bar 280 define an opening 290 for facilitation of emplacement of the device 250 in a mass of litter. A handle opening 286 is provided in the end member 278. A tapered end tip 284 of the bottom member 272 also facilitates emplacement into a litter mass. The end support bar 280 may serve as a handle and may have an opening (not shown) like the opening 286.

No particular species shown in any particular drawing herein is to be limited to the aspects shown in that particular drawing. Embodiments according to this invention are disclosed here which may incorporate one or more aspects of two or more particular disclosed species. For example (but not limited to) the embodiment of FIG. 1 may have a cut-out end handle as in the embodiment of FIGS. 8 or 9 and/or an end support bar as in the embodiment of FIG. 8 and/or one or more weights on the body member or on the reticulated structure. Similarly e.g. the embodiment of FIG. 8 may have a removable reticulated structure as does the embodiment of FIG. 1.

For each embodiment described above when used with clumping litter material, it is preferred that the litter material comprises material which agglomerates into waste-litter agglomerates with a largest dimension larger than a largest dimension of components (granules, pieces, fibers, etc.) of the litter material, and that the reticulated structure has openings sized so that the reticulated structure, upon removal from the mass of litter material, retains thereon the waste-litter agglomerates while allowing non-agglomerated litter components to pass therethrough back into the mass of litter material.

FIGS. 11A and 11B disclose a system 300 according to the present invention which has a lower container or pan 302 and a waste removal device 310. The pan 302 has a bottom 303, front end 304, a rear end 305 and opposed spaced-apart sides 306, 307. The front end 304 is slanted outwardly from bottom to top to facilitate removal of the waste removal device 310 from the pan 302. A lip 309 of the pan 302 extends downwardly from an upper horizontal edge 308 of the pan 302. One or more weight members (like the weight members 24 described above) may be used with the system 300 (or with any device or system disclosed herein).

The waste removal apparatus 310 according to the present invention has two side walls 312, 314 with handles 322 and 324, respectively; bottom member 326 with a bottom reticulated structure 330 and an end member 328. A tapered end tip (like the end tip 284, FIG. 8) may be provided on the bottom member 326 to facilitate emplacement into a litter mass.

Each handle 322, 324 has a cut-out portion 329 and an extending hook 327. Two living hinges 323, 325 spaced apart by a mid-portion 328 make it possible to bend the handles 322, 324 so that the hook 327 releasably engages the lip 309 (FIG. 11B). One living hinge 323 may be used, but another hinge 325, is preferred. The hook and the lip are, in certain preferred embodiments, made from suitable flexible material (e.g. plastic or rubber) and are so configured and sized that pulling on a handle releases its respective hook from the lip so that the waste removal device 310 is removable from the pan 302. An inclined portion 321 at the end of the hooks 327 facilitates pushing of the hook past an end 311 of the lip 309; i.e., the end 311 rides on the inclined portion 321. Incorporating such handles into any waste removal apparatus described above (which is within the scope of this invention) renders the apparatus releasably connectible to the pan. It is also within the scope of this invention to reverse the hook-lip arrangement, i.e. to have one or more hooks as the hook 327 on a side or top edge of the pan for engaging a lip or edge of the waste removal device that is positioned and disposed for such movement.

In other embodiments releasably cooperating hook-and-loop fasteners (e.g. VELCRO™ material) is used with such material on the edge 308 and/or lip 309 of the pan 302 and corresponding material on the mid-portion 328 and/or handles 322, 324. Such embodiments may include or delete the hooks 327.

Figure 12:
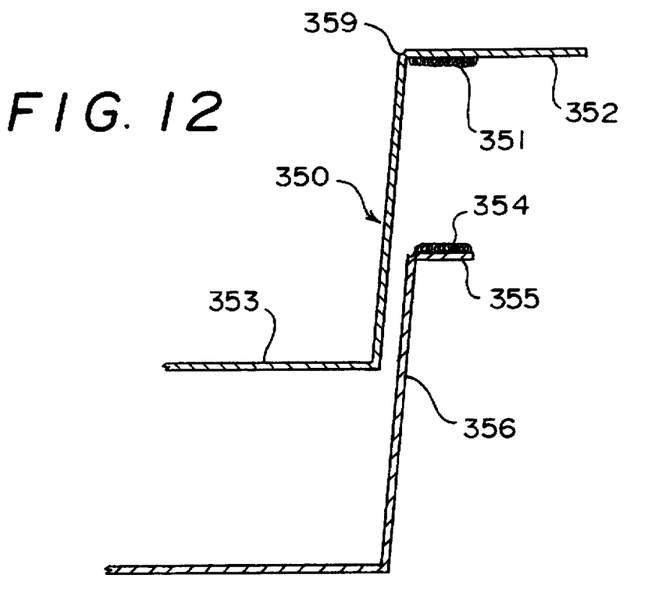
FIG. 12 is a side cross-sectional view of a container and waste removal device according to the present invention.

FIG. 12 shows a system 350 according to the present invention which is like the system 300 but without the hooks 327; without the living hinges 325; and with releasably cooperating hook-and-loop fastener material 351 on an underside of a handle 352 of a waste removal device 353 (like the waste removal device 310, FIG. 11A) and releasably cooperating hook-and-loop fastener material 354 on a lip 355 of a pan 356 (like the pan 302, FIG. 11A). An upward pull on the handle 352 releases the material 351 from the material 354 to release the device 353 from the pan 356. More than one handle 352 may be used and, in one aspect, two handles 352 are used positioned as are the handles 322, 324 in FIG. 11A. A living hinge 359 connects the handle(s) 352 to the waste removal device 353.

Figure 13:
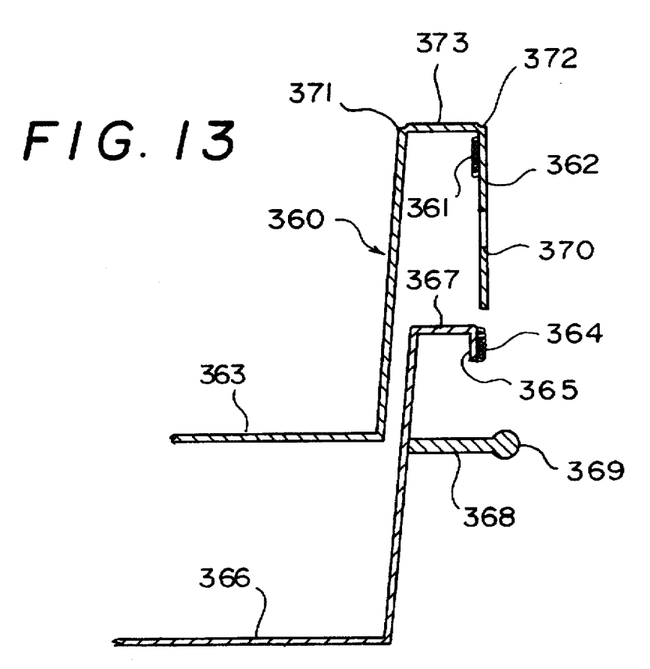
FIG. 13 is a side cross-sectional view of a container and waste removal device according to the present invention.

FIG. 13 shows a system 360 according to the present invention which is like the systems 300 and 350; but which has releasably cooperating hook-and-loop fastener material 361 on an underside of a handle 362 of a waste removal device 363 (like the waste removal devices 310 and 353) and releasably cooperating hook-and-loop fastener material 364 on a downward projecting lip 365 of a pan 366 (like the pans 302, 356) which extends down from a lip 367. A projecting member 368 with an end nose 369 is disposed, sized, and configured for insertion into and through a hole 370 in the handle 362. The hole is disposed, sized, and configured to releasably hold the projecting member 368. An appropriate slit in flexible material used for the handle 362 may also be used instead of a hole. Two living hinges 371 and 372 render the handle 362 movable with respect to a mid-portion 373 and the waste removal device 363. As previously described for system 350, more than one handle may be used.

Figures 14, 15:
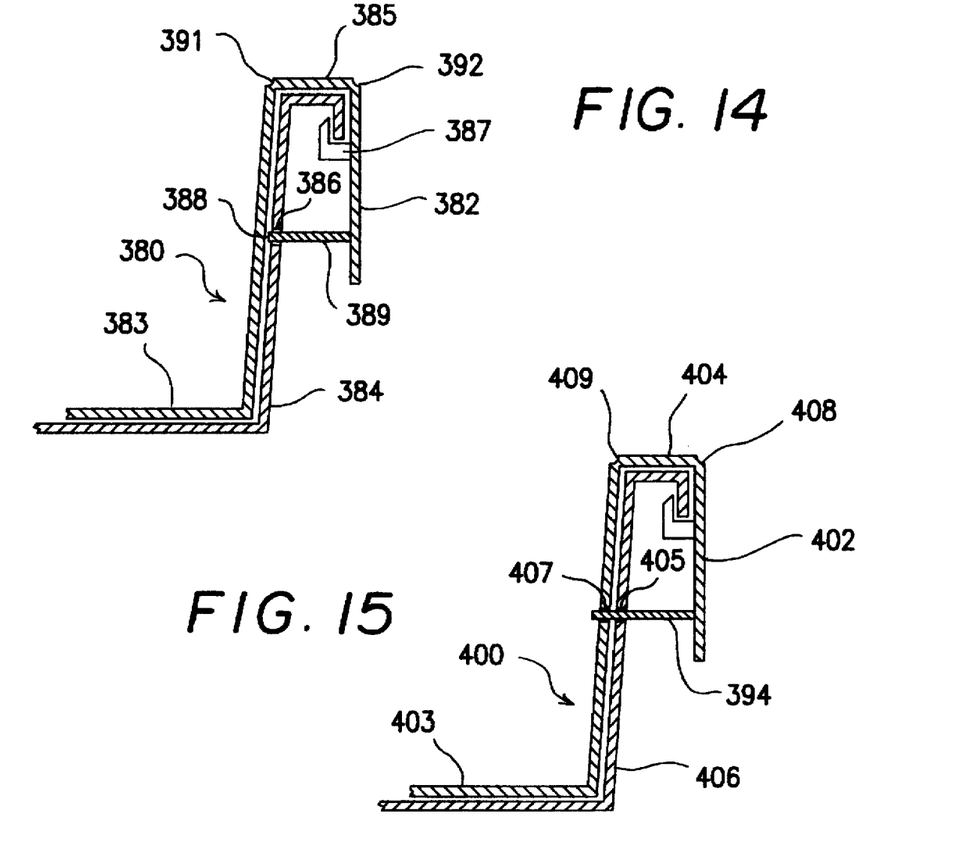
FIG. 14 is a side cross-sectional view of a container and waste removal device according to the present invention.
FIG. 15 is a side cross-sectional view of a container and waste removal device according to the present invention.

FIG. 14 discloses a system 380 according to the present invention and like the previously described system 300 and with a hook 387 on a handle 382 of a waste removal device 383; and with an inwardly projecting member 389 which has an end 388 releasably receivable and held in a hole or slit 386 of a container 384. The handle 382 has a mid portion 385 and living hinges 391 and 392. As previously described for system 350, more than one handle may be used.

FIG. 15 discloses a system 400 according to the present invention and like the system 380; but without any hooks 387 and with a projecting member 394 secured to or formed integrally of a handle 402 of a waste removal device 403. The projecting member 394 releasably projects through a hole 405 in a container 406 and through a hole 407 in the waste removal device 403. The handle 402 has a mid-portion 404 and living hinges 408, 409. As previously described for system 350, more than one handle may be used.

Figure 16:
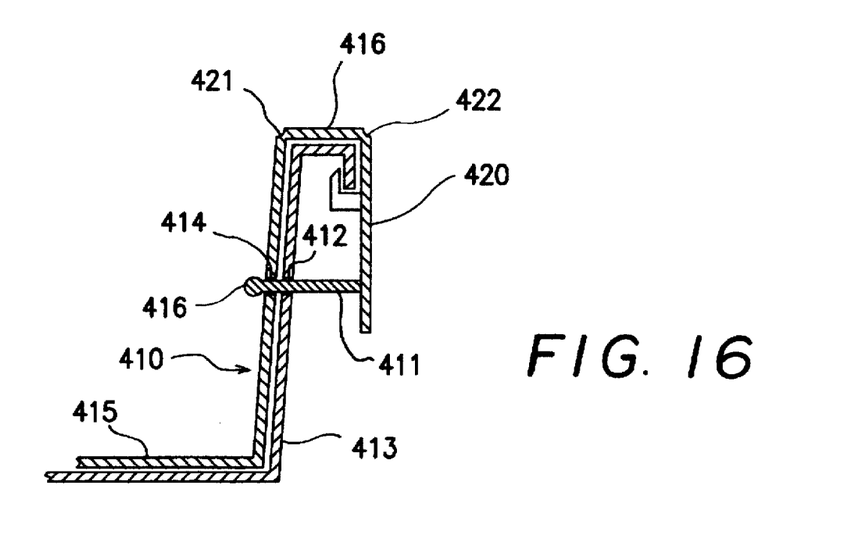
FIG. 16 is a side cross-sectional view of a container and waste removal device according to the present invention.

FIG. 16 discloses a system 410 like the systems 380 and 400; but with a projecting member 411 on a handle 420 which releasably projects through a hole or slit 412 in a container 413 and through a hole or slit 414 in a waste removal device 415. The projecting member 411 projects from a handle 420 and has an end bulb or nose 416 which pops through the holes or slits and either the container and waste removal device are made of appropriate flexible material (plastic, rubber, e.g.) or the projecting member is made of such material, or both are made of such material. More than one handle 420 may be used. Living hinges 421, 422 interconnect the waste removal device 415, a mid-portion 416, and the handle 420.

In conclusion, therefore, it is seen that the present invention and the embodiments disclosed herein and those covered by the appended claims are well adapted to carry out the objectives and obtain the ends set forth. Certain changes can be made in the subject matter described, shown and claimed without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A waste containment system for containing animal waste and for removing animal waste from a mass of litter material therein, the system comprising
a container with an interior space,
a waste removal apparatus removably disposed in the interior space of the container, the waste removal apparatus comprising
a body member having two opposed spaced apart sides and an open end,
a bottom member interconnected between the two sides,
an end member interconnected between the two sides,
a reticulated structure on the bottom member, and
releasing means connected to the container or to the waste removal apparatus for releasably connecting the waste removal apparatus to the container.

2. The system of claim 1 further comprising
the releasing means further comprising
at least one handle extending from the body member of the waste removal apparatus, and
interconnection means for releasably interconnecting the at least one handle to the container.

3. The system of claim 2 wherein the at least one handle is two handles, the handles are positioned or are attached on opposite sides of the body member.

4. The system of claim 2 wherein the container has a top edge and a lip extending downwardly from the top edge and wherein the interconnection means comprises a hook on the at least one handle for releasably engaging the lip of the container.

5. The system of claim 4 wherein the hook has an inclined surface for contacting and moving along a lower end of the lip to facilitate hooking of the lip by the hook.

6. The system of claim 2 wherein the at least one handle has at least one living hinge connecting the at least one handle to the body member to facilitate interconnection of the at least one handle and the container.

7. The system of claim 6 wherein the at least one living hinge is two spaced-apart living hinges with a connecting member therebetween.

8. The system of claim 1 further comprising
a bottom recess in the bottom member of the waste removal apparatus, and
the reticulated structure removably secured at the bottom recess.

9. The system of claim 1 further comprising
the litter material comprising material which agglomerates animal waste producing waste-litter agglomerates, and
the reticulated structure having openings sized so that the reticulated structure, upon removal from the mass of litter material, retains thereon the waste-litter agglomerates while allowing non-agglomerated litter components to pass therethrough back into the mass of litter material.

10. The system of claim 1 further comprising
the end member of the waste removal apparatus having a tapered end lip to facilitate emplacement of the apparatus in the mass of litter material.

11. The apparatus of claim 1 further comprising
at least one weight member on the body member of the waste removal apparatus.

12. The apparatus of claim 11 wherein the at least one weight member is secured to the reticulated structure.

13. The apparatus of claim 12 wherein
the reticulated structure has two spaced apart ends and is removably securable to the bottom member, and
the at least one weight member is two weight members formed integrally of the reticulated structure, one weight member at each end of the reticulated structure.

14. The system of claim 12 wherein the interconnecting means comprises releasably cooperating fastener material on an underside of the at least one handle and corresponding releasably cooperating fastener material on a surface of the container.

15. The system of claim 12 wherein the interconnection means comprises a projecting member projecting from the container and a corresponding opening in the at least one handle through which the projecting member is releasably projectable.

16. The system of claim 12 wherein the interconnection means comprises a projecting member projecting from the at least one handle and a corresponding opening in the container through which the projecting member is releasably projectable.

17. The system of claim 16 wherein the interconnection means further comprises an opening in the waste removal apparatus through which the projecting member is releasably projectable.

18. A waste containment system for containing animal waste and for removing animal waste from a mass of litter material therein, the system comprising a container with an interior space, a waste removal apparatus removably disposed in the interior space of the container, the waste removal apparatus comprising a body member having two opposed spaced apart sides and an open end, a bottom member interconnected between the two sides, an end member interconnected between the two sides, a reticulated structure on the bottom member, an end of each side and an end of the bottom member defining the open end of the body member, the open end of the body member facilitating introduction of the apparatus into the mass of litter material, an end support bar extending between the two sides at the open end of the body, the end support bar, two sides, and bottom member defining an end opening through which litter material passes into the apparatus, at least one handle secured to or formed integrally of the body member, the litter material comprising material which agglomerates animal waste producing waste-litter agglomerates, the reticulated structure having openings sized so that the waste removal apparatus, upon removal from the mass of litter material, retains thereon the waste-litter agglomerates while allowing non-agglomerated litter components to pass therethrough back into the mass of litter material, the end member having a tapered end lip to facilitate emplacement of the apparatus in the mass of litter material, the reticulated structure having two spaced apart ends, two weight members on the reticulated structure, one weight member at each end of the reticulated structure, and interconnection means connected to the at least one handle or to the container for releasably interconnecting the at least one handle to the container.

19. The system of claim 18 wherein the container has a top edge and a lip extending downwardly from the top edge and wherein the interconnection means comprises a hook on the at least one handle for releasably engaging the lip of the container.

* * * * *